H. BURT.
INSTRUMENT FOR ASSORTING EGGS.
No. 22,161. Patented Nov. 30. 1858.
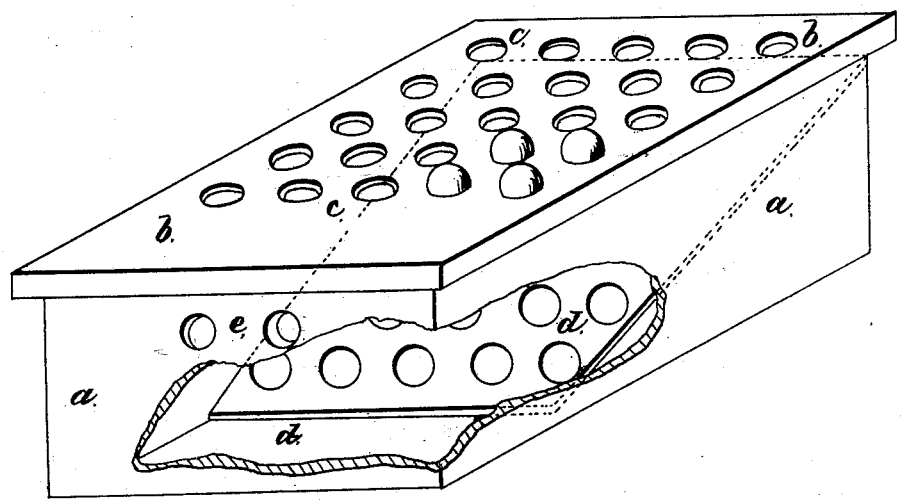

UNITED STATES PATENT OFFICE.

HENRY BURT, OF NEWARK, NEW JERSEY.

APPARATUS FOR ASSORTING EGGS.

Specification of Letters Patent No. 22,161, dated November 30, 1858.

*To all whom it may concern:*

Be it known that I, HENRY BURT, of the city of Newark, county of Essex, and State of New Jersey, have invented a new and useful Instrument for Assorting Good from Bad Eggs, and declare the following to be a full and exact description thereof, reference being had to the accompanying drawings and the letters thereon to illustrate the same.

The nature of my invention consists in the employment of a box made to exclude the light, except as hereinafter described. The top of this box (which may be movable or fixed) is perforated with holes of proper size to receive the eggs endwise and permit their resting therein at their largest diameter.

To the inside of the box (which should be painted black or some dark color) I attach a mirror diagonally, from near the top on one end, to near the other end at the bottom; in such a way as to reflect the eggs to the eye when placed at the observing orifice which should be in the last named end and near the top thereof. The eggs placed in the holes, are reflected in the mirror, the light being transmitted through them, those which are good will present a pinkish yellow tint, while those which are bad will be of a darkish color easily detected, and hence the selection of one from the other is done readily and sure.

For the use of dealers I use two or more movable tops to facilitate the operation; as while one set is being assorted and removed, a second cover is being filled by an assistant; this size should be about 15 inches long, 12 inches wide and 7 inches deep and will hold about three dozen eggs. For family use I prefer them of a size to hold six eggs only.

For use at night or in a dark apartment I reverse the transmission of light through the eggs, by placing a lamp inside the box, looking down upon the eggs from the outside, when the assorting may be done with like facility. The eye in either case will be readily instructed by the comparison of the eggs, and the test be found true and invariable. To this instrument I have given the name of bonoscope.

In the drawing $a$, $a$, represent the box; $b$, $b$, the perforated top or cover; $c$, $c$, the holes for the eggs; $d$, $d$, the mirror shown partly through a portion of the end and side cut away, and further by the dotted lines, and $e$, the observing orifice, opposite to which the eyes are placed looking into the mirror.

The mirror may be dispensed with by placing the observing orifices near the bottom of the box and looking upward, in which case it is more convenient to place the cover holding the eggs at an angle downward at the rear end, but with the mirror it is preferable.

I claim—

The arrangement of the perforated surface $b$, for receiving the eggs, and excluding the light as described; and I claim the mirror $d$ in combination with the above arranged substantially and for the purpose specified.

HENRY BURT.

Witnesses:
 I. B. HYDE,
 FRED. STEGMULLER.